UNITED STATES PATENT OFFICE.

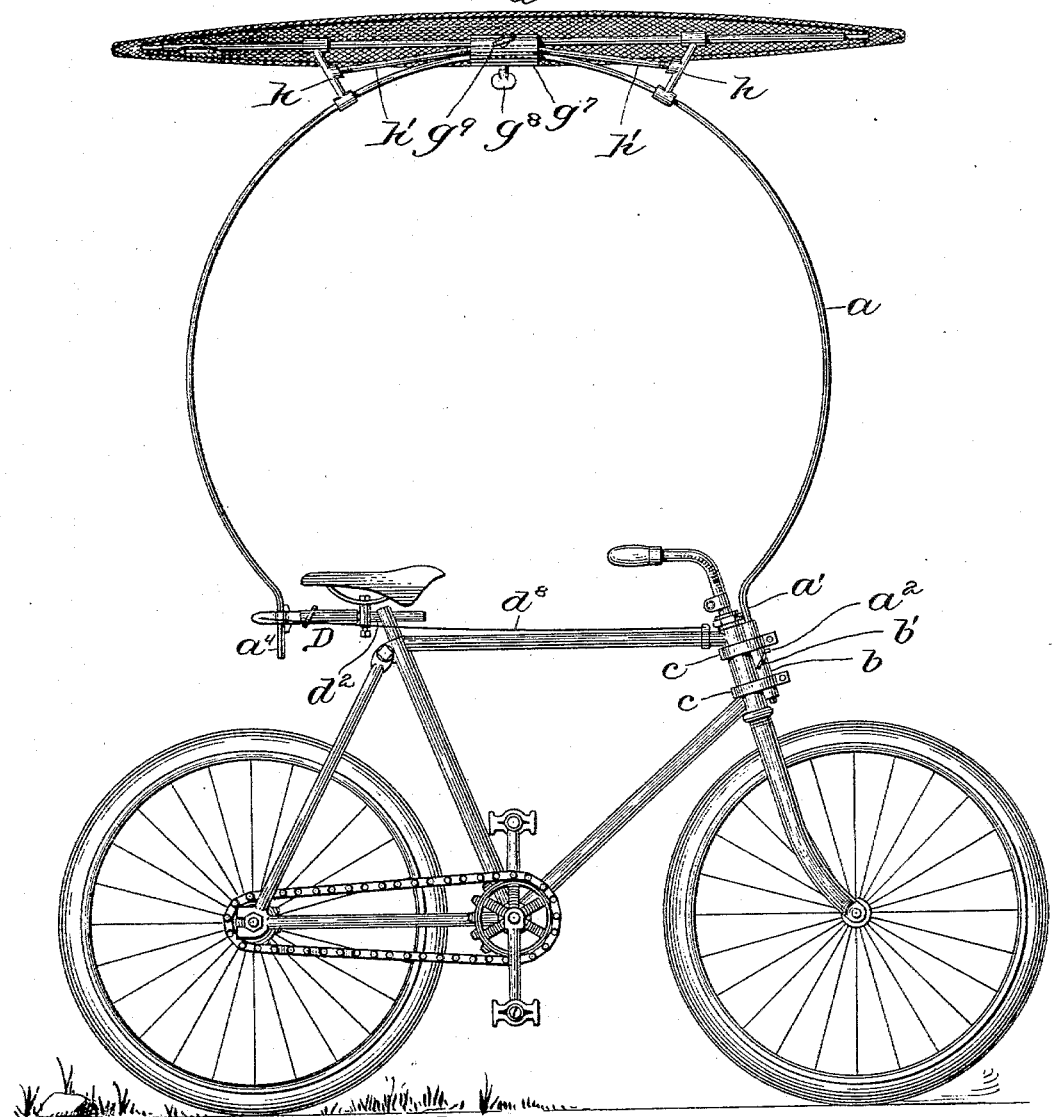

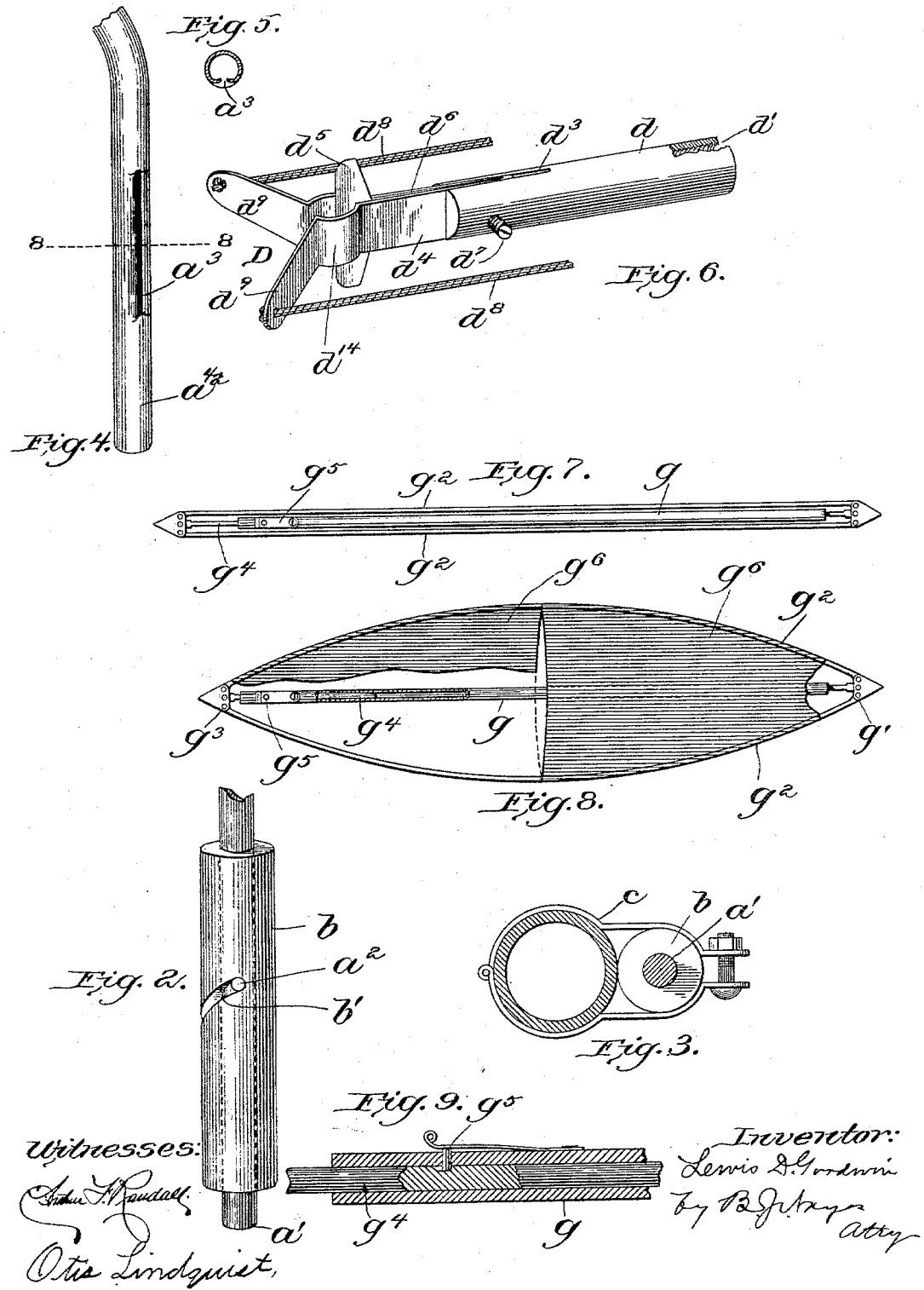

LEWIS D. GOODWIN, OF LAWRENCE, MASSACHUSETTS.

CANOPY FOR CYCLES.

SPECIFICATION forming part of Letters Patent No. 597,845, dated January 25, 1898.

Application filed August 12, 1897. Serial No. 647,949. (No model.)

*To all whom it may concern:*

Be it known that I, LEWIS D. GOODWIN, residing at Lawrence, county of Essex, and State of Massachusetts, have invented an Improvement in Canopies for Cycles, of which the following description, in connection with the accompanying drawings, is a specification, like letters on the drawings representing like parts.

This invention has for its object to construct a canopy attachment for cycles which may be attached to the frame of the machine in such a manner as to be rigidly supported thereby and the shade or shield of which may be adjusted forwardly and rearwardly over the head of the rider and at different angles of inclination to suit his convenience.

The canopy attachment for cycles embodying this invention consists, essentially, of a shade or shield supporting frame arched upwardly to pass over the head of the rider and connected at its ends to the frame of the machine in front of and behind the rider. For men's machines the front end of said shade-supporting frame may be pivotally connected to the machine-frame and its rear end may be detachably connected to the machine-frame, so that said rear end may be disconnected therefrom and the frame swung to one side of the machine, so as to permit the rider to have easy access to the seat while in the act of mounting and dismounting. Means are also provided whereby the rider when preparing to dismount may conveniently disconnect the rear end of said shade-supporting frame from the machine-frame. A shade or shield is provided which is connected to said supporting-frame in a manner to permit of adjustment thereof forwardly and rearwardly of the rider and at various angles of inclination to suit his convenience, and said shade or shield consists, essentially, of a frame covered with a suitable flexible material—as, for instance, a textile fabric. The said shade or shield frame is adapted to be expanded and contracted in the direction of its width, and means are provided whereby it may be secured in its expanded condition while in use.

Figure 1 is a side view of a bicycle having mounted thereon a canopy attachment embodying this invention. Fig. 2 is a detail of the forward end of the shade-supporting frame and means for pivotally supporting it. Fig. 3 is a detail showing means for attaching the front end of the shade-supporting frame to the frame of the machine. Fig. 4 is a detail of a portion of the rear end of the shade-supporting frame. Fig. 5 is a cross-section of the frame shown in Fig. 4 on the dotted line 8 8. Fig. 6 is a perspective view of a detachable connection for the rear end of the shade-supporting frame. Figs. 7 and 8 are details of the shade or shield detached, Fig. 7 showing the shade collapsed and Fig. 8 showing it expanded. Fig. 9 is a sectional detail showing means for locking the shade-frame in its expanded position.

In Fig. 1 I have shown a canopy attachment embodying this invention as attached to the frame of a bicycle.

$a$ represents a shade or shield supporting frame formed of a rod or bar, which is pivotally mounted at its forward end upon the upright front frame of the machine, or it may be to any other part of said frame in front of the seat, and which is arched or curved upwardly, so as to pass over the head of the rider, and which is attached at its rear end to the frame at a point behind the seat. As a means for pivotally connecting the forward end of said shade or shield supporting frame $a$ to the upright front frame of the machine the forward end of said frame is herein shown as formed with a straight end portion $a'$, which is fitted loosely into a sleeve $b$, and the said sleeve is formed with a spiral slot $b'$, into which extends a pin $a^2$, projecting from said end portion $a'$. The sleeve $b$ is rigidly secured in position upon the upright front frame of the machine by means of clamps $c\ c$, and when secured in position serves to pivotally support the frame $a$ in front of the seat.

The rear end of the shade or shield supporting frame $a$ is detachably connected to the rear portion of the frame of the machine, and for this purpose a spring-clip D is herein shown as attached to and as projecting rearwardly from the saddle-post.

The spring-clip D (see Fig. 6) is herein shown as consisting of a shank portion $d$, one end of which is formed with an interiorly-screw-threaded socket $d'$, which is fitted onto and engages an exteriorly-screw-threaded end of a horizontal extension $d^2$ of the saddle-post, and the opposite end of said shank portion is slotted, as at $d^3$, for the reception of the ends of a pair of spring-jaws $d^4$. The spring-jaws $d^4$ embrace a blade $d^5$, the shank $d^6$ of which latter is disposed between the jaws $d^4$, and the spring-jaws $d^4$ and blade $d^5$ are adjustably secured or clamped within the slot $d^3$ by means of a set-screw $d^7$.

The free ends of the spring-jaw $d^4$ are designed to engage the rear end of the frame $a$, and for this purpose said jaws are herein shown as formed with curved or hooked portions $d^{14}$, thereby forming a socket for a straight end portion $a^4$, provided or formed at the rear end of the frame $a$, which is adapted to be forcibly inserted between said hooked portions $d^{14}$.

The end of the blade $d^5$ is located between the hooked portions of the jaws $d^4$, and when the extension $a^4$ of the shade or shield supporting frame $a$ is inserted between said jaws the blade $d^5$ enters a longitudinal slot $a^3$, formed in said extension to receive said blade, and prevents vertical movement of that end of the frame $a$ while in engagement with the clip.

When the rear end of the frame $a$ is in engagement with the clip D, the pin $a^2$ at the forward end of the frame will occupy a position at the top of the spiral slot $b'$, and when the rear end of the frame $a$ is released or disengaged from the spring-clip D the weight of the frame $a$ will be borne by the pin $a^2$, which will be forced downwardly along the slot $b'$ to the bottom thereof, and during such movement the end portion $a'$, from which the pin $a^2$ projects, will be turned within the sleeve $b$, thereby swinging the rear end of the frame $a$ outwardly to one side of the frame of the machine and out of the way of the rider while in the act of mounting or dismounting.

In order that the rider while seated on the machine and about to dismount may conveniently and quickly release the rear end of the frame $a$ from the spring-clip D, I have herein provided two cords or the like $d^8$ $d^8$, which are each secured at one end to an ear or projection $d^9$, formed or provided on each spring-jaw $d^4$, and said cords extend forwardly of the machine and are secured at their forward ends to the frame of the machine, at the front end thereof, in such a manner as to be within reach of the rider and so that he may grasp the cords and by pulling thereon separate the jaws $d^4$, thus releasing the end of the frame $a$, and by reason of the inherent spring action of said frame $a$ the extremity $a^4$ thereof will slip out and away from the clip D, and it will then be free to swing to one side as the pin $a^2$ is moved along the slot $b'$ and the end portion $a'$ turns within the sleeve $b$.

A shield or shade G is provided, which is adjustably supported upon the frame $a$, and said shield or shade, as herein shown, (see Figs. 7 and 8,) consists of a frame having thereon a textile covering, and said shade-frame comprises an extensible middle bar $g$ $g^4$ and two flexible side bars $g^2$ $g^2$, loosely connected at their ends, as at $g'$ $g^3$, to the ends of said extensible middle bar $g$ $g^4$, and said extensible middle bar is herein shown as composed of a tubular bar $g$ and a rod or bar $g^4$, fitting within it and adapted to slide in and out telescopically, and a locking device, herein shown as a spring-pin $g^5$, is provided for locking said bar in its innermost position. The spring-pin $g^5$ is herein shown as attached to the tubular rod or bar $g$ and as passing through a hole in said rod or bar and adapted to engage a notch in the rod or bar $g^4$. (See Fig. 9.)

The locking device is arranged so that when the rod or bar $g^4$ is forced inwardly sufficiently to bow the side bars and expand the shade-frame the spring-pin $g^5$ will engage the notch in said rod or bar $g^4$, and when it is desired to collapse the shade said spring-pin $g^5$ will be lifted and thus disengaged from the notched rod or bar $g^4$, and the parts will then resume their collapsed position.

To the flexible bars $g^2$ are secured the edges of triangularly-shaped sections $g^6$ $g^6$, preferably of textile material, which are distended and stretched when the bars $g^2$ are bowed outwardly, as shown in Fig. 8, and which will fold up into small compass when the said bars are permitted to straighten out or lie in parallelism with the bar $g$.

As a means for securing the shade or shield upon its supporting-frame in a manner to permit of its adjustment thereon a block $g^7$ is herein shown as movably mounted on the frame $a$, having a thumb-screw $g^8$, by means of which it may be secured in adjusted position. The bar $g$ of the shade or shield also extends through a longitudinal hole formed in said block and is clamped or secured in adjusted position therein by means of a thumb-screw $g^9$. Stays or braces $h$ $h$ are provided, each mounted loosely at one end upon the frame $a$ and at the opposite end upon the bar $g$, and said stays are rigidly connected to the block $g^9$ by means of rods $h'$, so that when the block $g^7$ is moved along the frame $a$ the stays will also be carried therewith.

I claim—

1. A canopy for cycles comprising a shade-supporting frame pivotally connected at one end to the frame of the machine in front of the seat so as to turn on a substantially vertical axis, and having means for automatically turning it, and having its opposite end detachably connected to the frame of the machine behind the seat, and a shade secured to said frame, substantially as described.

2. A canopy for cycles comprising an upwardly-curved or arched shade-supporting frame pivotally connected at one end to the frame of the machine in front of the seat so as to turn on a substantially vertical axis, and having its opposite end detachably connected to the frame of the machine behind the seat, and a shade secured to said frame, substantially as described.

3. A canopy for cycles having an upwardly-curved or arched shade-supporting frame pivotally connected at one end to the frame of the machine in front of the seat, and having its opposite end slotted, a spring-clip attached to the frame of the machine behind the seat, formed with a socket adapted to receive the end of the shade-supporting frame, and having a blade within said socket which engages the slot in the end of the frame, substantially as described.

4. A canopy for cycles comprising an upwardly-curved or arched shade-supporting frame pivotally connected at one end to the frame of the machine in front of the seat, so as to turn on a substantially vertical axis, a spring-clip attached to the frame of the machine behind the seat for engaging the opposite end of said shade-supporting frame, means accessible to the rider while riding the machine for separating the parts of the said spring-clip to release the shade-supporting frame, substantially as described.

5. A canopy for cycles having an upwardly-curved or arched shade-supporting frame, a sleeve secured to the machine-frame which receives the front end of said shade-supporting frame, said sleeve having a spiral slot which receives a pin projecting from said shade-supporting frame, and a spring-clip also secured to the frame which engages the rear end of said shade-supporting frame, substantially as described.

6. A canopy for cycles comprising an upwardly-curved or arched shade-supporting frame connected at its ends to the frame of the machine, a movable block adjustably secured upon said curved or arched portion of the shade-supporting frame having rigidly secured to it diagonal braces $h$, the lower ends of which are mounted on said frame, and a shade or shield having a middle bar extended from end to end, which rests in a recess in said block and is adjustably secured thereto, and which is also loosely supported by the upper ends of said braces, substantially as described.

7. The herein-described shade or shield comprising a frame consisting of a telescopically-extensible middle bar, a single spring-acting side bar at each side of said middle bar extending from end to end thereof, and having its ends pivoted to the ends of said middle bar, and adapted to be bowed outwardly by shortening said middle bar, to thereby expand the frame, means for holding said frame expanded, and a cover for said frame, substantially as described.

8. The herein-described shade or shield comprising a frame consisting of a telescopically-extensible middle bar, a pair of spring-acting side bars at opposite sides of said middle bar extending from end to end thereof, the ends of which are loosely connected to the ends of said middle bar, a cover, and a spring-actuated pin for holding said frame expanded, substantially as described.

In testimony whereof I have signed my name to this specification in the presence of two subscribing witnesses.

LEWIS D. GOODWIN.

Witnesses:
B. J. NOYES,
ARTHUR F. RANDALL.